US012492277B2

(12) United States Patent
Jeon et al.

(10) Patent No.: US 12,492,277 B2
(45) Date of Patent: Dec. 9, 2025

(54) METHOD OF PREPARING GRAFT COPOLYMER AND METHOD OF PREPARING THERMOPLASTIC RESIN COMPOSITION INCLUDING THE SAME

(71) Applicant: LG CHEM, LTD., Seoul (KR)

(72) Inventors: Heejung Jeon, Daejeon (KR); Geon Soo Kim, Daejeon (KR); Moon Ja Hwang, Daejeon (KR); Hyung Joon Kim, Daejeon (KR); Changhoe Kim, Daejeon (KR); Minsu Chae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 899 days.

(21) Appl. No.: 17/771,679

(22) PCT Filed: Jul. 22, 2021

(86) PCT No.: PCT/KR2021/009462
§ 371 (c)(1),
(2) Date: Apr. 25, 2022

(87) PCT Pub. No.: WO2022/059903
PCT Pub. Date: Mar. 24, 2022

(65) Prior Publication Data
US 2022/0411559 A1    Dec. 29, 2022

(30) Foreign Application Priority Data

Sep. 18, 2020  (KR) .................... 10-2020-0120345

(51) Int. Cl.
  *C08F 279/04*   (2006.01)
  *C08F 6/18*     (2006.01)
  *C08F 220/06*   (2006.01)
  *C08F 220/14*   (2006.01)
  *C08F 220/18*   (2006.01)

(52) U.S. Cl.
  CPC .............. *C08F 279/04* (2013.01); *C08F 6/18* (2013.01); *C08F 220/06* (2013.01); *C08F 220/14* (2013.01); *C08F 220/1802* (2020.02); *C08F 220/1804* (2020.02)

(58) Field of Classification Search
  CPC ........ C08F 279/04; C08F 6/18; C08F 220/06; C08F 220/14; C08F 220/1802; C08F 220/1804; C08F 265/06; C08F 2500/24; C08L 9/00; C08L 25/12; C08L 53/02; C08L 55/02; B29B 11/10
  See application file for complete search history.

(56) References Cited

U.S. PATENT DOCUMENTS 4,740,557 A      4/1988  Nakai et al.
2003/0139514 A1  7/2003  Padwa
2015/0218369 A1  8/2015  Okamoto et al.
2017/0107373 A1* 4/2017  Matsuyama ............ C08L 69/00
2017/0327619 A1  11/2017 Suk et al.
2018/0362750 A1  12/2018 Lee et al.
2019/0177523 A1  6/2019  Jung et al.
2020/0140597 A1* 5/2020  Jeon ..................... C08F 265/06

FOREIGN PATENT DOCUMENTS

| CN | 107001514 A | 8/2017 |
| CN | 108368189 A | 8/2018 |
| CN | 108699317 A | 10/2018 |
| CN | 110914319 A | 3/2020 |
| EP | 2182010 A1 | 5/2010 |
| EP | 3626754 A1 | 3/2020 |
| JP | H0859704 A * | 3/1996 |
| JP | 2749529 B2 | 5/1998 |
| JP | 2004000934 A | 1/2004 |
| JP | 2008-248198 A | 10/2008 |
| JP | WO2014021475 A1 | 7/2016 |
| KR | 10-0199090 B1 | 6/1999 |
| KR | 10-0384375 B1 | 8/2003 |
| KR | 10-2016-0122494 A | 10/2016 |
| KR | 10-2019-0102979 A | 9/2019 |
| KR | 10-2020-0011701 A | 2/2020 |
| KR | 10-2020-0036507 A | 4/2020 |
| KR | 10-2020-0037979 A | 4/2020 |
| WO | WO-2019164176 A1 * | 8/2019 ............ C08F 2/22 |

OTHER PUBLICATIONS

English translation of JP H0859704A (Year: 1996).*
International Search Report and Written Opinion issued in corresponding International Patent Application No. PCT/KR2021/009462 dated Nov. 5, 2021.
Extended European Search Report issued Jul. 7, 2023 by the European Patent Office in corresponding European Patent Application No. 21863092.9.

* cited by examiner

*Primary Examiner* — Alicia Bland
(74) *Attorney, Agent, or Firm* — Morgan, Lewis & Bockius LLP

(57) ABSTRACT

Disclosed is a method of preparing a graft copolymer and a method of preparing a thermoplastic resin composition including the prepared graft copolymer. Also disclosed is a method of preparing a graft copolymer including a process of adding an aromatic vinyl monomer and a vinyl cyanide monomer to a conjugated diene rubber latex that is enlarged with a polymer particle diameter control agent that has a specific glass transition temperature and an average particle diameter in a specific ratio to an average particle diameter of a conjugated diene rubber latex, and graft-polymerizing the same; and a method of preparing a thermoplastic resin composition including the prepared graft copolymer.

Also disclosed is a graft copolymer prepared using the conjugated diene rubber latex enlarged with the polymer particle diameter control agent exhibiting the synergistic effect of improving both impact strength and fluidity.

10 Claims, No Drawings

METHOD OF PREPARING GRAFT COPOLYMER AND METHOD OF PREPARING THERMOPLASTIC RESIN COMPOSITION INCLUDING THE SAME

TECHNICAL FIELD

Cross-Reference to Related Application

The present application is a U.S. National Stage of PCT/KR2021/009462, filed on Jul. 22, 2021, which claims priority to Korean Patent Application No. 10-2020-0120345, filed on Sep. 18, 2020 in the Korean Intellectual Property Office, the disclosures of each of which are incorporated herein by reference.

The present invention relates to a method of preparing a graft copolymer and a method of preparing a thermoplastic resin composition including the same. More particularly, the present invention relates to a method of preparing a graft copolymer exhibiting a synergistic effect of improving both impact resistance and fluidity through enlargement of a conjugated diene rubber latex with a specific polymer particle size control agent, and a method of preparing a thermoplastic resin composition including the graft copolymer.

Background Art

ABS-based copolymers, which are represented by an acrylonitrile-butadiene-styrene copolymer (hereinafter referred to as "an ABS resin"), have excellent impact resistance and processability, thereby being broadly used in various fields such as automobiles, electric and electronic equipment, office equipment, home appliances, toys, and stationery.

In particular, the core technology of high impact-resistant ABS resins is a morphology related to the average particle diameter of a polybutadiene latex (PBL) constituting a core, a gel content therein, and the like. Conventionally, a large-diameter rubber latex having an average particle diameter of about 300 nm was used to improve the impact resistance of an ABS resin.

The large-diameter rubber latex is generally prepared by preparing a small-diameter rubber latex having an average particle diameter of 100 nm, and then enlarging the same with acetic acid. In this case, a gel content is very high at the level of 95% by weight, so that there is a limit in applying a high-impact grade.

To compensate for such a limitation, a method of applying a polymer particle diameter control agent has been proposed. A polymer particle diameter control agent exhibits latex stability relatively superior to the case of agglomeration with acetic acid, can be in-situ grafted, and exhibits slightly improved impact strength and fluidity. However, impact strength is not satisfied. Since the micro-agglomeration morphology cannot be maximally optimized by controlling the particle sizes of existing polymer particle diameter control agents, monomer types, or functional monomers, there is a limit in improving impact strength.

Therefore, there is a need for an ABS graft copolymer that has improved impact strength through maximization of the micro-agglomeration morphology of a conjugated diene rubber latex and thus is applicable to high-impact resistant products.

RELATED ART DOCUMENT

Patent Document

Korean Patent No. 384375

DISCLOSURE

Technical Problem

Therefore, the present invention has been made in view of the above problems, and it is one object of the present invention to provide a method of preparing a graft copolymer having excellent both impact resistance and fluidity while securing latex stability by adjusting a polymer particle diameter control agent, which serves to enlarge a conjugated diene rubber latex, to have a specific glass transition temperature and an average particle diameter in a specific ratio to the average particle diameter of a conjugated diene rubber latex.

In accordance with another aspect of the present invention, there is provided a method of preparing a thermoplastic resin composition having excellent impact resistance and fluidity by including a graft copolymer prepared according to the method.

In accordance with yet another aspect of the present invention, there is provided a thermoplastic resin composition that is prepared according to the thermoplastic resin composition preparation method and thus has an impact strength of 27 kgf·cm/cm or more measured according to ASTM D1238 under a specimen thickness condition of ¼".

The above and other objects can be accomplished by the present invention described below.

Technical Solution

In accordance with an aspect of the present invention, the above and other objects can be accomplished by the provision of a method of preparing a graft copolymer, the method including: a step of adding a polymer particle diameter control agent to a conjugated diene rubber latex to prepare an enlarged conjugated diene rubber latex; and a step of graft-polymerizing the enlarged conjugated diene rubber latex with an aromatic vinyl compound and a vinyl cyanide compound to prepare a vinyl cyanide compound-conjugated diene compound-aromatic vinyl compound graft copolymer, wherein the polymer particle diameter control agent is a copolymer including 82 to 99% by weight of an alkyl acrylate and 1 to 18% by weight of an unsaturated acid compound and has a glass transition temperature of 0 to 10.5° C., and a ratio ($PS_1/PS_2$) of an average particle diameter ($PS_1$) of the polymer particle diameter control agent to an average particle diameter ($PS_2$) of the conjugated diene rubber latex is 0.85 to 1.13.

In accordance with another aspect of the present invention, there is provided a method of preparing a graft copolymer, the method including: a step of adding a polymer particle diameter control agent to a conjugated diene rubber latex to prepare an enlarged conjugated diene rubber latex; and a step of graft-polymerizing the enlarged conjugated diene rubber latex with an aromatic vinyl compound and a vinyl cyanide compound to prepare a vinyl cyanide compound-conjugated diene compound-aromatic vinyl compound graft copolymer, wherein the polymer particle diameter control agent is a copolymer including 82 to 99% by weight of an alkyl acrylate and 1 to 18% by weight of an unsaturated acid compound and has a glass transition temperature of 0 to 10.5° C., a ratio ($PS_1/PS_2$) of an average particle diameter ($PS_1$) of the polymer particle diameter control agent to an average particle diameter ($PS_2$) of the conjugated diene rubber latex is 0.85 to 1.13, and the polymer particle diameter control agent has single glass transition temperature.

In accordance with another aspect of the present invention, there is provided a method of preparing a graft copolymer, the method including: a step of adding a polymer particle diameter control agent to a conjugated diene rubber latex to prepare an enlarged conjugated diene rubber latex; and a step of graft-polymerizing the enlarged conjugated diene rubber latex with an aromatic vinyl compound and a vinyl cyanide compound to prepare a vinyl cyanide compound-conjugated diene compound-aromatic vinyl compound graft copolymer, wherein the polymer particle diameter control agent is a copolymer including 82 to 99% by weight of an alkyl acrylate and 1 to 18% by weight of an unsaturated acid compound and has a glass transition temperature of 0 to 10.5° C., a ratio ($PS_1/PS_2$) of an average particle diameter ($PS_1$) of the polymer particle diameter control agent to an average particle diameter ($PS_2$) of the conjugated diene rubber latex is 0.85 to 1.13, and the polymer particle diameter control agent is added in an amount of 0.5 to 5 parts by weight based on 100 parts by weight (based on a solid) of the conjugated diene rubber latex to be enlarged.

In accordance with another aspect of the present invention, there is provided a method of preparing a thermoplastic resin composition, the method including: a step of adding a polymer particle diameter control agent to a conjugated diene rubber latex to prepare an enlarged conjugated diene rubber latex; a step of graft-polymerizing the enlarged conjugated diene rubber latex with an aromatic vinyl compound and a vinyl cyanide compound to prepare a vinyl cyanide compound-conjugated diene compound-aromatic vinyl compound graft copolymer; and a step of feeding the prepared vinyl cyanide compound-conjugated diene compound-aromatic vinyl compound graft copolymer and an aromatic vinyl compound-vinyl cyanide compound copolymer into an extruder and melt-kneading the same, followed by extrusion, wherein the polymer particle diameter control agent is a copolymer including 82 to 99% by weight of an alkyl acrylate and 1 to 18% by weight of an unsaturated acid compound and has a glass transition temperature of 0 to 10.5° C., and a ratio ($PS_1/PS_2$) of an average particle diameter ($PS_1$) of the polymer particle diameter control agent to an average particle diameter ($PS_2$) of the conjugated diene rubber latex is 0.85 to 1.13.

In accordance with another aspect of the present invention, there is provided a method of preparing a thermoplastic resin composition, the method including: a step of adding a polymer particle diameter control agent to a conjugated diene rubber latex to prepare an enlarged conjugated diene rubber latex; a step of graft-polymerizing the enlarged conjugated diene rubber latex with an aromatic vinyl compound and a vinyl cyanide compound to prepare a vinyl cyanide compound-conjugated diene compound-aromatic vinyl compound graft copolymer; and a step of feeding the prepared vinyl cyanide compound-conjugated diene compound-aromatic vinyl compound graft copolymer and an aromatic vinyl compound-vinyl cyanide compound copolymer into an extruder and melt-kneading the same, followed by extrusion, wherein the polymer particle diameter control agent is a copolymer including 82 to 99% by weight of an alkyl acrylate and 1 to 18% by weight of an unsaturated acid compound and has a glass transition temperature of 0 to 10.5° C., a ratio ($PS_1/PS_2$) of an average particle diameter ($PS_1$) of the polymer particle diameter control agent to an average particle diameter ($PS_2$) of the conjugated diene rubber latex is 0.85 to 1.13, and the polymer particle diameter control agent has single glass transition temperature.

In accordance with another aspect of the present invention, there is provided a method of preparing a thermoplastic resin composition, the method including: a step of adding a polymer particle diameter control agent to a conjugated diene rubber latex to prepare an enlarged conjugated diene rubber latex; a step of graft-polymerizing the enlarged conjugated diene rubber latex with an aromatic vinyl compound and a vinyl cyanide compound to prepare a vinyl cyanide compound-conjugated diene compound-aromatic vinyl compound graft copolymer; and a step of feeding the prepared vinyl cyanide compound-conjugated diene compound-aromatic vinyl compound graft copolymer and an aromatic vinyl compound-vinyl cyanide compound copolymer into an extruder and melt-kneading the same, followed by extrusion, wherein the polymer particle diameter control agent is a copolymer including 82 to 99% by weight of an alkyl acrylate and 1 to 18% by weight of an unsaturated acid compound and has a glass transition temperature of 0 to 10.5° C., a ratio ($PS_1/PS_2$) of an average particle diameter ($PS_1$) of the polymer particle diameter control agent to an average particle diameter ($PS_2$) of the conjugated diene rubber latex is 0.85 to 1.13, and the polymer particle diameter control agent is added in an amount of 0.5 to 5 parts by weight based on 100 parts by weight (based on a solid) of the conjugated diene rubber latex to be enlarged.

In accordance with another aspect of the present invention, there is provided a thermoplastic resin composition prepared by the thermoplastic resin composition preparation method, wherein an impact strength of the thermoplastic resin composition measured according to ASTM D1238 using a specimen with a thickness of ¼" is 27 kgf·cm/cm or more.

In accordance with another aspect of the present invention, there is provided a thermoplastic resin composition prepared by the thermoplastic resin composition preparation method, wherein a melt flow index (220° C., 10 kg) of the thermoplastic resin composition measured according to ASTM D1238 is 18 g/10 minutes or more.

In accordance with yet another aspect of the present invention, there is provided a thermoplastic resin composition prepared by the thermoplastic resin composition preparation method, wherein gloss of the thermoplastic resin composition measured at an angle of 45° according to ASTM D523 using a specimen with a thickness of ¼" (6.4 mm) is 98 or more.

Advantageous Effects

As apparent from the above description, a vinyl cyanide compound-conjugated diene compound-aromatic vinyl compound graft copolymer including an enlarged conjugated diene rubber latex prepared by polymer particle diameter control agent that has a specific glass transition temperature and a specific ratio of an average particle diameter of the polymer particle diameter control agent to an average particle diameter of the conjugated diene rubber latex exhibits a synergistic effect of excellent fluidity and greatly improved impact resistance.

BEST MODE

The present inventors conducted studies to improve the impact strength of a graft copolymer prepared by enlarging a conjugated diene rubber latex using a polymer particle diameter control agent, and then graft-polymerizing the same with an aromatic vinyl monomer and a vinyl cyanide monomer. As a result, the present inventors confirmed that, when a polymer particle diameter control agent is controlled to have a glass transition temperature within a predetermined range and an average particle diameter of the polymer particle diameter control agent is adjusted to be within a predetermined ratio to an average particle diameter of a conjugated diene rubber latex, fluidity is excellent and impact strength is greatly improved. Based on these results, the present inventors conducted further studies to complete the present invention.

Hereinafter, a method of preparing the graft copolymer according to the present disclosure and a method of preparing a thermoplastic resin composition according to the present disclosure are respectively described in detail.

Graft Copolymer Preparation Method

The method of preparing a graft copolymer according to the present disclosure includes a step of adding a polymer particle diameter control agent to a conjugated diene rubber latex to prepare an enlarged conjugated diene rubber latex; and a step of graft-polymerizing the enlarged conjugated diene rubber latex with an aromatic vinyl compound and a vinyl cyanide compound to prepare a vinyl cyanide compound-conjugated diene compound-aromatic vinyl compound graft copolymer, wherein the polymer particle diameter control agent is a copolymer including 82 to 99% by weight of an alkyl acrylate and 1 to 18% by weight of an unsaturated acid compound and has a glass transition temperature of 0 to 10.5° C., and a ratio ($PS_1/PS_2$) of an average particle diameter ($PS_1$) of the polymer particle diameter control agent to an average particle diameter ($PS_2$) of the conjugated diene rubber latex is 0.85 to 1.13. In this case, fluidity is superior and impact strength is excellent.

The polymer particle diameter control agent, for example, may be a copolymer including 82 to 99% by weight of an alkyl acrylate and an unsaturated acid compound 1 to 20% by weight, preferably a copolymer including 82 to 98% by weight of an alkyl acrylate and 2 to 18% by weight of an unsaturated acid compound. Within these ranges, latex stability and enlargement effect are excellent, and fluidity and impact resistance are improved.

The alkyl acrylate may be, for example, one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate, preferably one or more selected from the group consisting of methyl acrylate, ethyl acrylate, and butyl acrylate. In this case, latex stability and enlargement effect are excellent, and fluidity and impact resistance are improved.

The unsaturated acid compound may be, for example, one or more selected from the group consisting of (meth)acrylic acid, itaconic acid, crotonic acid, fumaric acid, maleic acid, citraconic acid, and anhydrides thereof, preferably (meth)acrylic acid. In this case, enlargement effect is excellent and the generation of a coagulum is reduced, which contributes productivity increase.

Preferably, the polymer particle diameter control agent may be a copolymer including 0.1 to 10% by weight of methyl acrylate, 0.1 to 10% by weight of ethyl acrylate, 70 to 85% by weight of butyl acrylate, and 1 to 18% by weight of (meth)acrylic acid, more preferably a copolymer including 1.5 to 4.5% by weight of methyl acrylate, 0.5 to 3% by weight of ethyl acrylate, 78 to 82% by weight of butyl acrylate, and 12 to 18% by weight of (meth)acrylic acid. In this case, latex stability and enlargement effect are excellent, and fluidity and impact resistance are improved.

As another example, the polymer particle diameter control agent may be preferably a copolymer including 75 to 95% by weight of ethyl acrylate, 0.01 to 10% by weight of butyl acrylate, 0 to 10% by weight of methyl acrylate, and 1 to 18% by weight of (meth)acrylic acid, more preferably a copolymer including 80 to 92% by weight of ethyl acrylate, 0.1 to 7% by weight of butyl acrylate, 0 to 5% by weight of methyl acrylate, and 2 to 15% by weight of (meth)acrylic acid.

Even more preferably, the polymer particle diameter control agent may be a copolymer including 87 to 92% by weight of ethyl acrylate, 0.1 to 2% by weight of butyl acrylate, 0 to 3% by weight of methyl acrylate, and 7 to 12% by weight of (meth)acrylic acid. In this case, latex stability and enlargement effect are excellent, and fluidity and impact resistance are improved.

As another example, the polymer particle diameter control agent may be preferably a copolymer including 82 to 99% by weight of methyl acrylate and 1 to 18% by weight of (meth)acrylic acid, more preferably a copolymer including 95 to 99% by weight of methyl acrylate and 1 to 5% by weight of (meth)acrylic acid. In this case, latex stability and enlargement effect are excellent, and fluidity and impact resistance are improved.

As another example, the polymer particle diameter control agent may be preferably a copolymer including 0.01 to 10% by weight of methyl acrylate, 75 to 95% by weight of ethyl acrylate, 0.01 to 10% by weight of butyl acrylate, and 1 to 18% by weight of (meth)acrylic acid, more preferably a copolymer including 0.05 to 5% by weight of methyl acrylate, 80 to 95% by weight of ethyl acrylate, 1 to 15% by weight of butyl acrylate, and 2 to 10% by weight of (meth)acrylic acid. In this case, latex stability and enlargement effect are excellent, and fluidity and impact resistance are improved.

The glass transition temperature of the polymer particle diameter control agent may be, for example, 0 to 10.5° C., preferably 0.1 to 10° C., more preferably 0.3 to 9.8° C. Within these ranges, latex stability and enlargement effect are excellent, and fluidity and impact resistance are improved.

In this disclosure, a glass transition temperature may be measured at a temperature increase rate of 10° C. using TA Instruments Q100 as a differential scanning calorimeter (DSC) according to ASTM D 3418, unless otherwise specified.

The polymer particle diameter control agent may have preferably single glass transition temperature. In this case, impact resistance is greatly improved. On the other hand, a polymer particle diameter control agent having a core-shell structure exhibits two glass transition temperature. In this case, impact strength is rather reduced even if the glass transition temperatures are within the above range.

Preferably, the structure of the polymer particle diameter control agent is not a core-shell structure.

A ratio ($PS_1/PS_2$) of the average particle diameter ($PS_1$) of the polymer particle diameter control agent to the average particle diameter ($PS_2$) of the conjugated diene rubber latex may be, for example, 0.85 to 1.13, preferably 0.88 to 1.13. Within these ranges, latex stability and enlargement effect are excellent, and impact resistance is greatly improved.

The average particle diameter of the polymer particle diameter control agent may be, for example, 500 to 2,000 Å, preferably 700 to 1,700 Å, more preferably 900 to 1,500 Å, most preferably 1,000 to 1,300 Å. Within these ranges, latex stability and enlargement effect are excellent, and impact resistance is greatly improved.

In this disclosure, average particle diameter may be measured by dynamic light scattering, and specifically, may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 psec.

Based on 100 parts by weight (based on a solid) of the conjugated diene rubber latex, the polymer particle diameter control agent may be added in an amount of preferably 0.5 to 5 parts by weight, more preferably 1 to 4.5 parts by weight, even more preferably 1.2 to 3 parts by weight. Within these ranges, latex stability is excellent, and coagulum generation is reduced.

The polymer particle diameter control agent may be polymerized with, for example, 0.05 to 2 parts by weight, preferably 0.1 to 0.5 parts by weight, of an initiator. Within these ranges, polymerization efficiency is improved.

The initiator may be, for example, one or more selected from the group consisting of ammonium persulfate, sodium persulfate, potassium persulfate, and butyl hydroperoxide. In this case, polymerization efficiency is improved.

The polymer particle diameter control agent may be polymerized with, for example, 0.1 to 2 parts by weight, preferably 0.5 to 1.5 parts by weight, more preferably 0.8 to 1.2 parts by weight, of an emulsifier.

The emulsifier may be, for example, one or more selected from the group consisting of alkyl sulfosuccinate metal salts having 12 to 18 carbon atoms and derivatives thereof, alkyl sulfate esters having 12 to 20 carbon atoms and derivatives thereof, and alkyl sulfonic acid metal salts having 12 to 20 carbon atoms and derivatives thereof.

The alkyl sulfosuccinate metal salts having 12 to 18 carbon atoms or derivatives thereof may be, for example, one or more selected from the group consisting of dicyclohexyl sulfosuccinate, dihexyl sulfosuccinate, di-2-ethyl hexyl sulfosuccinate sodium salt, di-2-ethyl hexyl sulfosuccinate potassium salt, dioctyl sulfosuccinate sodium salt, and dioctyl sulfosuccinate potassium salt.

The alkyl sulfate esters having 12 to 20 carbon atoms or derivatives thereof, and the alkyl sulfonic acid metal salts having 12 to 20 carbon atoms or derivatives thereof may be, for example, one or more selected from the group consisting of sodium lauryl sulfate, sodium dodecyl sulfate, sodium dodecyl benzene sulfate, sodium octadecyl sulfate, sodium oleic sulfate, potassium dodecyl sulfate, and potassium octadecyl sulfate.

The average particle diameter of the conjugated diene rubber latex may be, for example, 500 to 1,500 Å, preferably 700 to 1,400 Å, more preferably 900 to 1,300 Å. Within these ranges, a latex can be enlarged in a short time to have a large diameter, whereby productivity is excellent.

When the conjugated diene rubber latex is enlarged using the polymer particle diameter control agent, a unique microagglomerated rubber structure is formed in the rubber latex. Accordingly, the impact strength of a graft copolymer including the rubber latex is improved.

A method of preparing the conjugated diene rubber latex may include, for example, a step of feeding 85 to 95 parts by weight of conjugated diene compound based on 100 parts by weight in total of a conjugated diene compound, 1 to 4 parts by weight of an emulsifier, 0.1 to 0.6 parts by weight of a polymerization initiator, 0.1 to 1 part by weight of an electrolyte, 0.1 to 0.5 parts by weight of a molecular weight modifier, and 70 to 130 parts by weight of deionized water batchwise, and polymerizing the same at 50 to 60° C.; a step of feeding 0.05 to 1.2 parts by weight of an initiator at a polymerization conversion rate of 30 to 40% and elevating the temperature to 65 to 75° C. for polymerization; a step of feeding 5 to 15 parts by weight of a conjugated diene compound at a polymerization conversion rate of 60 to 70% and polymerizing the same; and a step of terminating the polymerization at a polymerization conversion rate of 93 to 98%. In this case, a conjugated diene rubber latex can be stably prepared within a short time.

In this disclosure, a polymerization conversion rate may be measured by a measurement method commonly used in the art to which the present invention belongs. As a particular example, 1.5 g of the prepared latex is dried in a hot air dryer at 135° C. for 20 minutes, and then the weight thereof is measured to find a total solid content (TSC) according to Equation 1 below. The resultant value is applied to Equation 2 below. Equation 2 is calculated based on 100 parts by weight in total of the added monomers.

Total solid content (TSC: %)=Weight after drying/Weight before drying×100    Equation 1

Polymerization conversion rate (%)=[Total solid content (TSC)×(Total weight of sum of added monomers, deionized water, and subsidiary raw materials)/100]−(Weight of fed subsidiary raw materials, except for monomers and deionized water)    Equation 2

In Equation 2, the subsidiary raw materials refer to an initiator, an emulsifier, an electrolyte, and a molecular weight modifier.

The added monomers refer to a conjugated diene compound, an aromatic vinyl compound, and a vinyl cyanide compound.

The emulsifier used to prepare the conjugated diene rubber latex may be, for example, one or more selected from the group consisting of allyl aryl sulfonates, alkali methyl alkyl sulfonates, sulfonated alkyl esters, fatty acid soap, and rosin acid alkali salts. In this case, polymerization stability is excellent, and a rubber latex having a desired diameter can be prepared.

The electrolyte used to prepare the conjugated diene rubber latex may be, for example, one or more selected from the group consisting of $KCl$, $NaCl$, $KHCO_3$, $NaHCO_3$, $K_2CO_3$, $Na_2CO_3$, $KHSO_3$, $K_2SO_4$, $NaHSO_3$, $K_2P_2O_7$, $Na_2P_2O_7$, $K_3PO_4$, $Na_3PO_4$, and $K_2HPO_4$. In this case, latex stability is excellent.

The molecular weight modifier used to prepare the conjugated diene rubber latex may be, for example, one or more selected from the group consisting of t-dodecyl mercaptan, n-dodecyl mercaptan, n-octyl mercaptan, and carbon tetrachloride, preferably t-dodecyl mercaptan.

The initiator used to prepare the conjugated diene rubber latex may be, for example, one or more selected from the group consisting of fat-soluble persulfates such as cumene hydroperoxide, diisopropyl benzene hydroperoxide, azobis iso butyronitrile, t-butyl hydroperoxide, paramenthane hydroperoxide, and benzoylperoxide; peroxy monomers; and a redox-based polymerization initiator in which an oxidizing agent and a reducing agent are combined. In this case, emulsion polymerization can be efficiently performed.

The average particle diameter of the enlarged conjugated diene rubber latex may be, for example, 2,500 to 4,500 Å, preferably 2,700 to 4,300 Å, more preferably 3,000 to 4,200 Å, even more preferably 3,300 to 4,000 Å. Within these ranges, a graft copolymer including the enlarged latex exhibits greatly improved impact strength.

In the step of preparing the enlarged conjugated diene rubber latex, for example, the polymer particle diameter control agent may be added to the conjugated diene rubber latex and stirred therewith for 5 to 30 minutes after elevating the temperature to 45 to 55° C., preferably the polymer particle diameter control agent may be added to the conjugated diene rubber latex and stirred therewith for 10 to 20 minutes after elevating the temperature to 47 to 52° C. In this case, the conjugated diene rubber latex can be uniformly enlarged, and latex stability is excellent.

The glass transition temperature of the polymer particle diameter control agent determines the flexibility of the quantum entanglement of chains in the polymer particle diameter control agent at a temperature at which the conjugated diene rubber latex is enlarged, thereby affecting the enlargement ability. When the glass transition temperature of the polymer particle diameter control agent is lower than the range of the present invention, the flexibility of chains increases so that enlargement occurs, but, over time, latex stability is decreased so that impact resistance is not improved. On the other hand, when the glass transition temperature of the polymer particle diameter control agent is higher than the range of the present invention, the rubber diameter relatively increases after enlargement so that particles having a large diameter of 1 μm or more are generated, resulting in impact resistance decrease.

The graft polymerization step may be, for example, a step of graft-polymerizing 40 to 70% by weight (based on a solid) of an enlarged conjugated diene rubber latex with 5 to 20% by weight of a vinyl cyanide compound and 17 to 40% by weight of an aromatic vinyl compound, preferably a step of graft-polymerizing 55 to 65% by weight (based on a solid) of an enlarged conjugated diene rubber latex with 5 to 15% by weight of a vinyl cyanide compound and 25 to 35% by weight of an aromatic vinyl compound. Within these ranges, impact strength and property balance are excellent.

For example, 0.01 to 1 part by weight of an initiator may be added during the graft polymerization. Within this range, polymerization stability is excellent, and polymerization efficiency is improved.

The initiator may be, for example, one or more selected from the group consisting of fat-soluble persulfates such as cumene hydroperoxide, diisopropyl benzene hydroperoxide, azobis iso butyronitrile, t-butyl hydroperoxide, paramenthane hydroperoxide, and benzoylperoxide; peroxy monomers; and a redox-based polymerization initiator in which an oxidizing agent and a reducing agent are combined. In this case, polymerization can be efficiently performed.

During the graft copolymer polymerization, for example, an oxidation-reduction catalyst may be further included. Here, any oxidation-reduction catalyst commonly used to prepare a graft copolymer may be used selectively used without specific limitation.

The step of preparing the graft copolymer may include, for example, a step of agglomerating the latex prepared by the graft-polymerization, preferably an agglomeration step, an aging step, a dehydration step, and a drying step. When subjected to the steps, a graft copolymer may be provided in a powder form. Any agglomeration, aging, dehydration and drying steps commonly used in the art may be used without specific limitation.

In the agglomeration step of the graft copolymer preparation method, for example, an acid coagulant, such as sulfuric acid, phosphoric acid, or hydrochloric acid, or a salt coagulant such as magnesium sulfate, aluminum sulfate, or calcium chloride, may be added alone or in combination.

Other than the particulars aforementioned regarding the method of preparing a graft copolymer, other reaction conditions such as a reaction time, reaction temperature, pressure, and the addition time points of reactants may be appropriately selected and used as needed without specific limitation so long as they are within the ranges commonly used in the technical field to which the present invention belongs.

In this disclosure, the conjugated diene compound may be, for example, one or more selected from the group consisting of 1,3-butadiene, 2,3-dimethyl-1,3-butadiene, 2-ethyl-1,3-butadiene, 1,3-pentadiene, isoprene, chloroprene, and piperylene.

In this disclosure, the aromatic vinyl monomer may be, for example, one or more selected from the group consisting of styrene, α-methyl styrene, o-methyl styrene, ρ-methyl styrene, m-methyl styrene, ethyl styrene, isobutyl styrene, t-butyl styrene, o-bromo styrene, ρ-bromo styrene, m-bromo styrene, o-chloro styrene, ρ-chloro styrene, m-chloro styrene, vinyltoluene, vinylxylene, fluorostyrene, and vinylnaphthalene.

In this disclosure, the vinyl cyanide compound may be, for example, acrylonitrile, methacrylonitrile, or a mixture thereof.

Thermoplastic Resin Composition Preparation Method

A method of preparing a thermoplastic resin composition according to the present disclosure includes a step of adding a polymer particle diameter control agent to a conjugated diene rubber latex to prepare an enlarged conjugated diene rubber latex; a step of graft-polymerizing the enlarged conjugated diene rubber latex with an aromatic vinyl compound and a vinyl cyanide compound to prepare a vinyl cyanide compound-conjugated diene compound-aromatic vinyl compound graft copolymer; and a step of feeding the prepared vinyl cyanide compound-conjugated diene compound-aromatic vinyl compound graft copolymer and an aromatic vinyl compound-vinyl cyanide compound copolymer into an extruder and melt-kneading the same, followed by extrusion, wherein the polymer particle diameter control agent is a copolymer prepared by polymerizing 82 to 99% by weight of an alkyl acrylate and 1 to 18% by weight of an unsaturated acid compound and has a glass transition temperature of 0 to 10.5° C., and a ratio ($PS_1/PS_2$) of the average particle diameter ($PS_1$) of the polymer particle diameter control agent to the average particle diameter ($PS_2$) of the small-diameter conjugated diene rubber latex is 0.85 to 1.13. In this case, the prepared thermoplastic resin composition exhibits excellent impact strength and fluidity.

The step of preparing the vinyl cyanide compound-conjugated diene compound-aromatic vinyl compound graft copolymer may include, for example, a step of agglomerating, dehydrating, and drying the vinyl cyanide compound-conjugated diene compound-aromatic vinyl compound graft copolymer.

The aromatic vinyl compound-vinyl cyanide compound copolymer may be prepared, for example, by polymerizing 60 to 95% by weight, preferably 65 to 90% by weight, more preferably 70 to 85% by weight, of an aromatic vinyl compound; and 5 to 40% by weight, preferably 10 to 35% by weight, more preferably 15 to 30% by weight, of a vinyl cyanide compound.

The melt-kneading may be performed at, for example, 200 to 280° C., preferably 220 to 260° C.

The melt-kneading may be performed, for example, using a Banbury mixer, a single-screw extruder, a twin-screw extruder, a kneader reactor, or the like, without specific limitation.

During the melt-kneading, one or more additives selected from the group consisting of a colorant, a heat stabilizer, a light stabilizer, a reinforcing agent, a filler, a flame retardant, a lubricant, a plasticizer, an antistatic agent, and a processing aid may be selectively added as needed.

In describing the thermoplastic resin composition preparation method, particulars overlapping with the aforementioned graft copolymer preparation step are omitted.

The Izod impact strength (thickness ¼"), measured according to ASTM D256, of the thermoplastic resin composition may be, for example, 27 kgf·cm/cm or more, preferably 27 to 40 kgf·cm/cm, more preferably 30 to 37 kgf·cm/cm. Within these ranges, property balance is excellent, and the composition can be applied to various products requiring high impact strength.

The melt flow index (220° C., 10 kg), measured according to ASTM D1238, of the thermoplastic resin composition may be, for example, 18 g/10 minutes or more, preferably 19 to 25 g/10 minutes, more preferably 21 to 24 g/10 minutes. Within these ranges, fluidity is excellent so that various shapes can be easily molded.

The gloss, measured at 45° according to ASTM D523 using a specimen with a thickness of ¼" (6.4 mm), of the thermoplastic resin composition may be, for example, 98 or more, preferably 99 or more. Within these ranges, property balance is superior and excellent appearance is exhibited.

The present invention may include, for example, an injection-molded article manufacturing method characterized by including the thermoplastic resin composition preparation method according to the present disclosure.

The injection-molded article manufacturing method may include, for example, a step of injection-molding the thermoplastic resin composition according to the present disclosure using an injection machine.

The injection-molded article may be, for example, an electrical part, an electronic part, office equipment, or an automobile part.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Preparation Example A-1: Polymer Particle Diameter Control Agent Preparation 98.3 parts by weight of distilled water, 0.05 parts by weight of sodium dioctyl sulfosuccinate as an emulsifier, and 0.6 parts by weight of potassium persulfate as an initiator were fed into a reactor, and temperature was elevated to 80° C. while stirring, followed by allowing to stand for 3 minutes. Meanwhile, 47.5 parts by weight of deionized water, 1 part by weight of sodium dioctyl sulfosuccinate, 2 parts by weight of methyl acrylate (MA), 1.0 part by weight of ethyl acrylate (EA), 80.9 parts by weight of butyl acrylate (BA), and 16.1 parts by weight of methacrylic acid (MAA) were fed and uniformly mixed to prepare a reaction solution.

Polymerization was carried out while continuously feeding the reaction solution into the reactor over 5 hours. The polymerization was terminated when a polymerization conversion rate was 98%. Finally, a polymer particle diameter control agent having an average particle diameter of 1,100 Å was obtained. Here, a glass transition temperature was 0.5° C.

Preparation Examples A-2 to A-11: Polymer Particle Diameter Control Agent Preparation Experiments were carried out in the same manner as in Preparation Example A-1, except that the components and contents summarized in Tables 1 and 2 were used to prepare polymer particle diameter control agents.

Preparation Example A-12: Polymer Particle Diameter Control Agent Preparation 98.3 parts by weight of distilled water, 0.05 parts by weight of sodium dioctyl sulfosuccinate as an emulsifier, and 0.6 parts by weight of potassium persulfate as an initiator were fed into a reactor, and temperature was elevated to 80° C. while stirring, followed by allowing to stand for 3 minutes. Meanwhile, 14.3 parts by weight of deionized water, 0.3 parts by weight of sodium dioctyl sulfosuccinate, 29.7 parts by weight of methyl acrylate (MA), 0.2 parts by weight of ethyl acrylate (EA), and 0.1 parts by weight of butyl acrylate (BA) were uniformly mixed to prepare Reaction Solution 1. The prepared Reaction Solution 1 was continuously fed into the reactor over 90 minutes. Next, 33.2 parts by weight of deionized water, 0.7 parts by weight of sodium dioctyl sulfosuccinate, 67.3 parts by weight of methyl acrylate (MA), and 2.7 parts by weight of methacrylic acid (MAA) were uniformly mixed to prepare Reaction Solution 2. Polymerization was carried out while continuously feeding the prepared Reaction Solution 2 into the reactor over 3 hours and 30 minutes. The polymerization was terminated when the polymerization conversion rate was 98%.

Finally, a polymer particle diameter control agent having an average particle diameter of 1,100 Å was obtained. The resultant polymer particle diameter control agent had a core-shell structure and two glass transition temperatures of 1.2° C. and 9.7° C.

Preparation Example B-1: Conjugated Diene Rubber Latex Preparation 75 parts by weight of deionized water, 90 parts by weight of 1,3-butadiene as a monomer, 2.7 parts by weight of a dimer acid potassium salt (Cas No. 67701-19-3) as an emulsifier, 0.08 parts by weight of potassium carbonate ($K_2CO_3$) as an electrolyte, 0.1 parts by weight of tertiary dodecyl mercaptan (TDDM) as a molecular weight regulator, 0.15 parts by weight of tertiary butyl hydroperoxide as an initiator, 0.06 parts by weight of dextrose, 0.005 parts by weight of sodium pyrophosphate, and 0.0025 parts by weight of ferrous sulfate were fed batchwise into a polymerization reactor filled with nitrogen, and polymerization was initiated at 55° C. 0.25 parts by weight of potassium persulfate was fed batchwise at a polymerization conversion rate of 30 to 40% into the polymerization reactor, and then polymerization was performed while elevating the temperature up to 72° C. Next, 10 parts by weight of 1,3-butadiene were fed batchwise into the polymerization reactor at a polymerization conversion rate 60 to 70% of, and then the polymerization was terminated at a polymerization conversion rate of 95%. Here, the average particle diameter of the conjugated diene rubber latex was 1,250 Å.

Preparation Example B-2: Conjugated Diene Rubber Latex Preparation 75 parts by weight of deionized water, 90 parts by weight of 1,3-butadiene as a monomer, 3 parts by weight of a dimer acid potassium salt (Cas No. 67701-19-3) as an emulsifier, 0.15 parts by weight of potassium carbonate ($K_2CO_3$) as an electrolyte, 0.1 parts by weight of tertiary dodecyl mercaptan (TDDM) as a molecular weight regulator, 0.15 parts by weight of tertiary butyl hydroperoxide as an initiator, 0.06 parts by weight of dextrose, 0.005 parts by weight of sodium pyrophosphate, and 0.0025 parts by weight of ferrous sulfate were fed batchwise into a polymerization reactor filled with nitrogen, and polymerization was initiated at 55° C. 0.3 parts by weight of potassium persulfate was fed batchwise at a polymerization conversion rate of 30 to 40% into the polymerization reactor, and then polymerization was performed while elevating the temperature up to 72° C. Next, 10 parts by weight of 1,3-butadiene were fed batchwise into the polymerization reactor at a polymerization conversion rate 60 to 70% of, and then the polymerization was terminated at a polymerization conversion rate of 95%. Here, the average particle diameter of the conjugated diene rubber latex was 1,060 Å.

Preparation Example B-3: Conjugated Diene Rubber Latex Preparation 75 parts by weight of deionized water, 90 parts by weight of 1,3-butadiene as a monomer, 2.9 parts by weight of a dimer acid potassium salt (Cas No. 67701-19-3) as an emulsifier, 0.1 parts by weight of potassium carbonate ($K_2CO_3$) as an electrolyte, 0.1 parts by weight of tertiary dodecyl mercaptan (TDDM) as a molecular weight regulator, 0.15 parts by weight of tertiary butyl hydroperoxide as an initiator, 0.06 parts by weight of dextrose, 0.005 parts by weight of sodium pyrophosphate, and 0.0025 parts by weight of ferrous sulfate were fed batchwise into a polymerization reactor filled with nitrogen, and polymerization was initiated at 55° C. 0.3 parts by weight of potassium persulfate was fed batchwise at a polymerization conversion rate of 30 to 40% into the polymerization reactor, and then polymerization was performed while elevating the temperature up to 72° C. Next, 10 parts by weight of 1,3-butadiene were fed batchwise into the polymerization reactor at a polymerization conversion rate 60 to 70% of, and then the polymerization was terminated at a polymerization conversion rate of 95%. Here, the average particle diameter of the small-diameter rubber latex was 1,180 Å.

Preparation Example B-4: Conjugated Diene Rubber Latex Preparation 75 parts by weight of deionized water, 92 parts by weight of 1,3-butadiene as a monomer, 2.3 parts by weight of a dimer acid potassium salt (Cas No. 67701-19-3) as an emulsifier, 0.08 parts by weight of potassium carbonate ($K_2CO_3$) as an electrolyte, 0.1 parts by weight of tertiary dodecyl mercaptan (TDDM) as a molecular weight regulator, 0.15 parts by weight of tertiary butyl hydroperoxide as an initiator, 0.06 parts by weight of dextrose, 0.005 parts by weight of sodium pyrophosphate, and 0.0025 parts by weight of ferrous sulfate were fed batchwise into a polymerization reactor filled with nitrogen, and polymerization was initiated at 55° C. 0.31 parts by weight of potassium persulfate was fed batchwise at a polymerization conversion rate of 30 to 40% into the polymerization reactor, and then polymerization was performed while elevating the temperature up to 72° C. Next, 8 parts by weight of 1,3-butadiene were fed batchwise into the polymerization reactor at a polymerization conversion rate 60 to 70% of, and then the polymerization was terminated at a polymerization conversion rate of 95%. Here, the average particle diameter of the small-diameter rubber latex was 1,310 Å.

Example 1

<Preparation of Rubber Latex Enlarged with Polymer Particle Diameter Control Agent>

100 parts by weight (based on a solid) of the conjugated diene rubber latex (average particle diameter: 1,250 Å) prepared according to Preparation Example B-1 was stirred in a reactor while elevating the temperature to 50° C., and then 2.0 parts by weight of the polymer particle diameter control agent prepared according to Preparation Example A-1 were added thereto, followed by stirring for 15 minutes to be enlarged. The average particle diameter of the enlarged rubber latex was 3780 Å.

<Preparation of Graft Copolymer and Thermoplastic Resin Composition>

30 parts by weight of styrene, 10 parts by weight of acrylonitrile, and 0.34 parts by weight of t-dodecyl mercaptan (TDDM) were mixed, and then were continuously fed into 60 parts by weight (based on a solid) of the prepared enlarged rubber latex over 3 hours to be graft-polymerized, thereby obtaining an ABS graft copolymer latex. 0.5 parts by weight of an emulsion (average particle diameter: 0.9 μm) prepared by mixing Wingstay-L (LATON KOREA CO., LTD.), with IR107 (LATON KOREA CO., LTD.) as an antioxidant in a weight ratio of 0.8:0.2 were fed into the obtained ABS graft copolymer latex, and then the temperature was elevated to 84° C., followed by feeding 3.0 parts by weight of magnesium sulfate ($MgSO_4$) thereto to be agglomerated. Next, the temperature was elevated to 98° C. over 10 minutes, and then dehydration was performed in a dehydrator, followed by drying. As a result, a powder was obtained.

Next, 25% by weight of the ABS graft copolymer powder and 75% by weight of an acrylonitrile-styrene copolymer were fed into and mixed in a mixer, followed by pelletizing using a twin-screw extruder. Next, a specimen for property measurement was manufactured using an injection machine. The weight-average molecular weight of the acrylonitrile-styrene copolymer was 140,000 g/mol and included 24% by weight of acrylonitrile and 76% by weight of styrene.

Examples 2 to 6, Comparative Examples 1 to 6, and Reference Example 1

<Preparation of Rubber Latex Enlarged with Polymer Particle Diameter Control Agent>

Experiments were carried out in the same manner as in Example 1, except that a conjugated diene rubber latex and a polymer particle diameter control agent were used as summarized in Tables 1 and 2.

<Preparation of Graft Copolymer and Thermoplastic Resin Composition>

Experiments were carried out in the same manner as in Example 1, except that the enlarged rubber latex prepared as described above was used.

Test Example

The properties of the specimens manufactured according to Examples 1 to 6, Comparative Examples 1 to 6, and Reference Example 1 were measured according to the following methods. Results are summarized in Tables 1 and 2 below.

Measurement Methods

Average particle diameter (Å): Measured using a particle size analyzer (NICOMP 380).

Izod impact strength (kgf·cm/cm): Measured according to ASTM D256 using a specimen with a thickness of ¼".

Melt flow index (MI; g/10 minutes): Measured according to ASTM D1238 at 220° C.

Gloss: Measured at an angle of 45° according to ASTM D523 using a specimen with a thickness of ¼" (6.4 mm).

TABLE 1

| Classification | | Example 1 | Example 2 | Example 3 | Example 4 | Example 5 | Example 6 |
|---|---|---|---|---|---|---|---|
| Polymer particle diameter control agent | Type | Preparation Example A-1 | Preparation Example A-2 | Preparation Example A-3 | Preparation Example A-4 | Preparation Example A-3 | Preparation Example A-5 |
| | MA (% by weight) | 2.0 | — | 97.8 | 3.8 | 97.8 | 0.1 |
| | EA (% by weight) | 1.0 | 90.2 | — | 1.0 | — | 89.9 |
| | BA (% by weight) | 80.9 | 1.0 | — | 79.0 | — | 1.5 |
| | MMA (% by weight) | 16.1 | 8.8 | 2.2 | 16.2 | 2.2 | 8.5 |
| | Tg (° C.) | 0.5 | 4.2 | 9.6 | 1.0 | 9.6 | 3.9 |
| | Average particle diameter (Å) ($PS_1$) | 1100 | 1200 | 1180 | 1250 | 1180 | 1140 |
| Conjugated diene rubber latex | Type | Preparation Example B-1 | Preparation Example B-2 | Preparation Example B-3 | Preparation Example B-1 | Preparation Example B-4 | Preparation Example B-2 |
| | Average particle diameter (Å) ($PS_2$) | 1250 | 1060 | 1170 | 1250 | 1310 | 1060 |
| Enlarged rubber latex | Average particle diameter (Å) | 3780 | 3880 | 3560 | 3980 | 3700 | 3630 |
| $PS_1/PS_2$ | | 0.88 | 1.13 | 1.01 | 1.00 | 0.90 | 1.08 |
| Thermoplastic resin composition | Impact strength | 30.2 | 33.6 | 31.9 | 30.9 | 31.4 | 30.0 |
| | MI | 23.0 | 22.5 | 22.8 | 23.1 | 22.7 | 22.6 |
| | Gloss | 99.7 | 99.9 | 100.1 | 99.1 | 98.9 | 99.4 |

TABLE 2

| Classification | | Comparative Example 1 | Comparative Example 2 | Comparative Example 3 | Comparative Example 4 | Comparative Example 5 | Comparative Example 6 | Reference Example 1 |
|---|---|---|---|---|---|---|---|---|
| Polymer particle diameter control agent | Type | Preparation Example A-6 | Preparation Example A-7 | Preparation Example A-8 | Preparation Example A-9 | Preparation Example A-10 | Preparation Example A-8 | Preparation Example A-11 |
| | MA (% by weight) | 0.5 | — | 96.4 | — | 96.2 | — | 97 |
| | EA (% by weight) | — | — | — | 93.0 | 0.4 | 3.5 | 0.2 |
| | BA (% by weight) | 82.5 | 82.1 | 0.5 | — | — | 75.0 | 0.1 |
| | MMA (% by weight) | 16.0 | 17.9 | 3.1 | 7.0 | 3.4 | 21.5 | 2.7 |
| | Tg (° C.) | −2.7 | −11.1 | 12.3 | 0.7 | 8.9 | 8.3 | 1.2/9.7 |
| | Average particle diameter (Å) ($PS_1$) | 1140 | 1060 | 1300 | 1220 | 990 | 1200 | 1070 |
| Conjugated diene rubber latex | Type | Preparation Example B-1 | Preparation Example B-2 | Preparation Example B-3 | Preparation Example B-2 | Preparation Example B-1 | Preparation Example B-2 | Preparation Example B-2 |
| | Average particle diameter (Å) ($PS_2$) | 1250 | 1060 | 1170 | 1060 | 1250 | 1170 | 1060 |

TABLE 2-continued

| Classification | | Comparative Example 1 | Comparative Example 2 | Comparative Example 3 | Comparative Example 4 | Comparative Example 5 | Comparative Example 6 | Reference Example 1 |
|---|---|---|---|---|---|---|---|---|
| Enlarged rubber latex | Average particle diameter (Å) | 3700 | 3450 | 4210 | 4050 | 3860 | 4900 | 4030 |
| $PS_1/PS_2$ | | 0.91 | 1.00 | 1.11 | 1.15 | 0.8 | 1.03 | 1.01 |
| Thermoplastic resin composition | Impact strength | 20.0 | 21.1 | 17.8 | 17.9 | 22.0 | 15.4 | 23.1 |
| | MI | 19.0 | 18.9 | 20.6 | 22.0 | 21.5 | 21.5 | 19.7 |
| | Gloss | 97.0 | 96.4 | 91.0 | 89.7 | 95.9 | 88.5 | 90.7 |

As shown in Tables 1 and 2, the thermoplastic resin compositions of Examples 1 to 6 including the polymer particle diameter control agent according to the present invention exhibited the synergistic effect of improving both impact strength and fluidity, compared to Comparative Examples 1 to 6.

In particular, in the case of Comparative Examples 1 to 3 wherein the glass transition temperature of the polymer particle diameter control agent was outside of the range of the present invention, impact strength was poor. In addition, in the case of Comparative Examples 4 and 5 wherein a ratio ($PS_1/PS_2$) of the average particle diameter ($PS_1$) of the polymer particle diameter control agent to the average particle diameter ($PS_2$) of the conjugated diene rubber latex was outside of the range of the present invention, impact strength was greatly decreased.

In addition, in the case of Comparative Example 6 wherein the content of the unsaturated acid compound in the polymer particle diameter control agent was outside of the range of the present invention, impact strength and gloss were greatly decreased.

Further, in the case of Reference Example 1 wherein the polymer particle diameter control agent had a core-shell structure and two glass transition temperatures, the $PS_1/PS_2$ ratio was included within the range of the present invention, but impact strength was low compared to Examples 1 to 6.

The invention claimed is:

1. A method of preparing a graft copolymer, the method comprising:
   adding a polymer particle diameter control agent to a conjugated diene rubber latex to prepare an enlarged conjugated diene rubber latex; and
   graft-polymerizing the enlarged conjugated diene rubber latex with an aromatic vinyl compound and a vinyl cyanide compound to prepare a vinyl cyanide compound-conjugated diene compound-aromatic vinyl compound graft copolymer,
   wherein the polymer particle diameter control agent is a copolymer comprising:
   0.1 to 10% by weight of methyl acrylate, 0.1 to 10% by weight of ethyl acrylate, 70 to 85% by weight of butyl acrylate, and 1 to 18% by weight of (meth)acrylic acid;
   a copolymer comprising 75 to 95% by weight of ethyl acrylate, 0.01 to 10% by weight of butyl acrylate, 0 to 10% by weight of methyl acrylate, and 1 to 18% by weight of (meth)acrylic acid;
   a copolymer comprising 82 to 99% by weight of methyl acrylate and 1 to 18% by weight of (meth)acrylic acid; or
   a copolymer comprising 0.01 to 10% by weight of methyl acrylate, 75 to 95% by weight of ethyl acrylate, 0.01 to 10% by weight of butyl acrylate, and 1 to 18% by weight of (meth)acrylic acid;
   the polymer particle diameter control agent has a glass transition temperature of 0.5 to 9.6° C., and
   a ratio ($PS_1/PS_2$) of an average particle diameter ($PS_1$) of the polymer particle diameter control agent to an average particle diameter ($PS_2$) of the conjugated diene rubber latex is 0.88 to 1.13 wherein an impact strength of a thermoplastic resin composition measured according to ASTM D1238 using a specimen of the thermoplastic resin composition with a thickness of ¼" is 27 kgf·cm/cm or more, and
   wherein the thermoplastic resin composition includes the graft copolymer.

2. The method according to claim 1, wherein the polymer particle diameter control agent has an average particle diameter of 500 to 2,000 Å.

3. The method according to claim 1, wherein the polymer particle diameter control agent has single glass transition temperature.

4. The method according to claim 1, wherein the polymer particle diameter control agent is added in an amount of 0.5 to 5 parts by weight based on 100 parts by weight of the conjugated diene rubber latex based on a solid.

5. The method according to claim 1, wherein the conjugated diene rubber latex has an average particle diameter of 500 to 1,500 Å.

6. The method according to claim 1, wherein, in the step of adding a polymer particle diameter control agent, the conjugated diene rubber latex is elevated to a temperature of 45 to 55° C., and then the polymer particle diameter control agent is added thereto, followed by stirring for 20 to 40 minutes.

7. The method according to claim 1, wherein the enlarged conjugated diene rubber latex has an average particle diameter of 2,500 to 4,500 Å.

8. The method according to claim 1, wherein, in the step of graft-polymerizing, 40 to 70% by weight of the enlarged conjugated diene rubber latex based on a solid is graft-polymerized with 5 to 20% by weight of the vinyl cyanide compound and 17 to 40% by weight of the aromatic vinyl compound.

9. The method according to claim 1, further comprising agglomerating the vinyl cyanide compound-conjugated diene compound-aromatic vinyl compound graft copolymer.

10. A method of preparing a thermoplastic resin composition, the method comprising:
    adding a polymer particle diameter control agent to a conjugated diene rubber latex to prepare an enlarged conjugated diene rubber latex;
    graft-polymerizing the enlarged conjugated diene rubber latex with an aromatic vinyl compound and a vinyl cyanide compound to prepare a vinyl cyanide compound-conjugated diene compound-aromatic vinyl compound graft copolymer; and feeding the prepared vinyl cyanide compound-conjugated diene compound-aromatic vinyl compound graft copolymer and an aromatic vinyl compound-vinyl cyanide compound copolymer into an extruder and melt-kneading the same, followed by extrusion,
wherein the polymer particle diameter control agent is a copolymer comprising:
0.1 to 10% by weight of methyl acrylate, 0.1 to 10% by weight of ethyl acrylate, 70 to 85% by weight of butyl acrylate, and 1 to 18% by weight of (meth)acrylic acid;
a copolymer comprising 75 to 95% by weight of ethyl acrylate, 0.01 to 10% by weight of butyl acrylate, 0 to 10% by weight of methyl acrylate, and 1 to 18% by weight of (meth)acrylic acid;
a copolymer comprising 82 to 99% by weight of methyl acrylate and 1 to 18% by weight of (meth)acrylic acid; or
a copolymer comprising 0.01 to 10% by weight of methyl acrylate, 75 to 95% by weight of ethyl acrylate, 0.01 to 10% by weight of butyl acrylate, and 1 to 18% by weight of (meth)acrylic acid;
the polymer particle diameter control agent has a glass transition temperature of 0.5 to 9.6° C., and
a ratio ($PS_1/PS_2$) of an average particle diameter ($PS_1$) of the polymer particle diameter control agent to an average particle diameter ($PS_2$) of the conjugated diene rubber latex is 0.88 to 1.13, and
wherein an impact strength of the thermoplastic resin composition measured according to ASTM D1238 using a specimen of the thermoplastic resin composition with a thickness of ¼" is 27 kgf·cm/cm or more.

\* \* \* \* \*